Feb. 7, 1956  L. SUKACEV  2,733,709
SELF-HEATING CONTAINERS
Filed Dec. 9, 1952

INVENTOR
Lev Sukacev
BY Frank H. Wisch.
ATTORNEY

United States Patent Office 2,733,709
Patented Feb. 7, 1956

2,733,709

SELF-HEATING CONTAINERS

Lev Sukacev, New York, N. Y.

Application December 9, 1952, Serial No. 324,945

8 Claims. (Cl. 126—262)

This invention relates to self-heating containers for packaged food or other material, including means for heating with exothermically reacting substances.

In the present invention, a container, the contents of which are generally to be heated for consumption or use, is enclosed in an outer container having therein a substance such as burnt or kiln-dried lime or other suitable chemical which reacts with water or other added substance and liberates sufficient heat to bring the contents to a desired temperature. The inner container is set in the outer container in such relation to the latter and to the exothermically reacting or heat-generating substances that the reactants are readily brought together. No special manipulation is required for heating the inner container other than the mere removal of the cover of the outer container and bringing together the heat-generating reactants. Means are preferably provided for permitting a guided, outward or telescopic movement of the inner container in the outer container and to allow for expansion during the heating operation.

The invention is further described in detail hereinbelow by way of exemplification, and with reference to the accompanying drawing in which—

Figure 1:
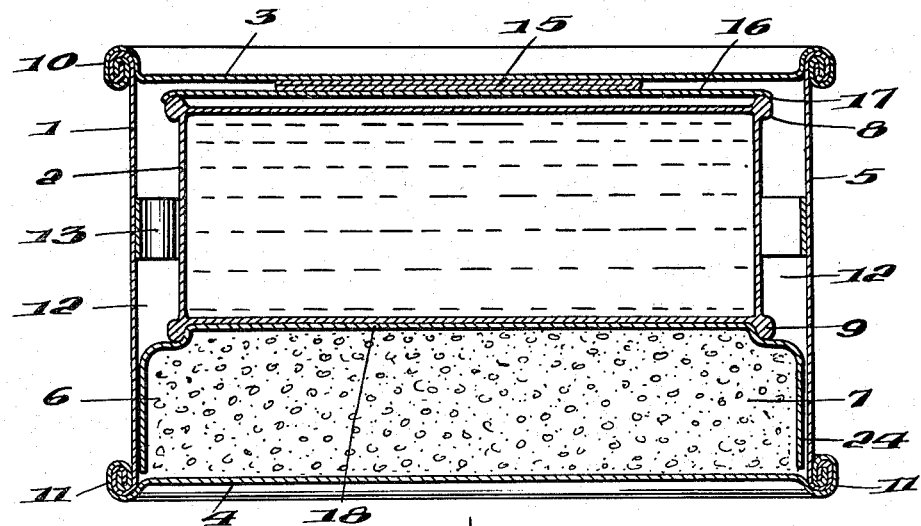
Fig. 1 is a view of a vertical section of a self-heating container embodying preferred features of the invention.

Referring to the drawing, the self-heating container includes an outer container 1, and an inner container 2 in which preserved food, or other material to be heated, is enclosed. The outer container 1 has a top 3, a bottom 4 and side wall 5, and has completely enclosed therein the inner container 2 and material 6 for generating heat. The heat-generating material is preferably in a layer 7 in the bottom of the outer container. The inner container 2 is held or clamped in fixed position between the top 3 of the outer container 1 and the layer 7 of heat-generating material.

Both the outer container 1 and the inner container 2 are preferably of the usual food-can construction, cylindrical or prismatic in shape. The top and bottom of each container are crimp-sealed to the side wall, as shown at 8, 9, 10 and 11. The outer container is large enough to provide a space 12 between side wall thereof and the side wall of the inner container, and to permit its enclosure beneath the top of the outer container with a quantity of heat-generating material sufficient to react with an added reagent such as water for instance, to liberate heat for raising the temperature of the contents of the container 2 to a desired range within a relatively short period of time. A spacing element 13 is provided in the space 12 between the inner container and the side wall 5 of the outer container. This space, which permits the passage of water into the bottom of the container 1, is sufficiently wide for the insertion of an ordinary can opener blade without penetrating the container 2 when removing the top 3 of the outer container 1. The spacing element shown, is a solid flexible strip of corrugated metal extending around the inner container 1. Its corrugations form passages 14 for directing the water toward the bottom of the outer container. Any means will serve as this spacing element which will not only permit the passage of water, aid in the uniform distribution thereof, and maintain the inner container 2 in spaced relation to the wall 5 of the outer container 1, but which will preferably also direct the outward movement of the inner container in said spaced relation upon removal of the top of the outer container and on expansion of the heat-generating material. The spacing element should also preferably cooperate to prevent complete removal of the inner container through the top of the outer container.

Additional features which conveniently serve in the improved operation of this invention are further indicated. A folded container 15, such as a folded paper cup, is provided for measuring the water or other liquid reactant to be added to the lime or other solid reactant in the bottom of the outer container. A sheet 16 of material such as non-absorbent paper, easily removable, extends over the top of the inner container 2 with its edge fastened by means of an adhesive 17 to the ridge of the crimped seal 8. This serves to shed and to distribute poured-in water in a substantially uniform manner into the space 12 around the inner container, and to prevent accumulation of the water on the top thereof. An absorbent fibrous sheet 18 extending across the top of the layer 7 of heat-generating material 6 and downwardly adjacent the wall 5 of the outer container in the manner of an inverted pan, serves to maintain the particles of the material in place under the container 2 and also serves to distribute the water more uniformly over the layer 7.

Figure 2:
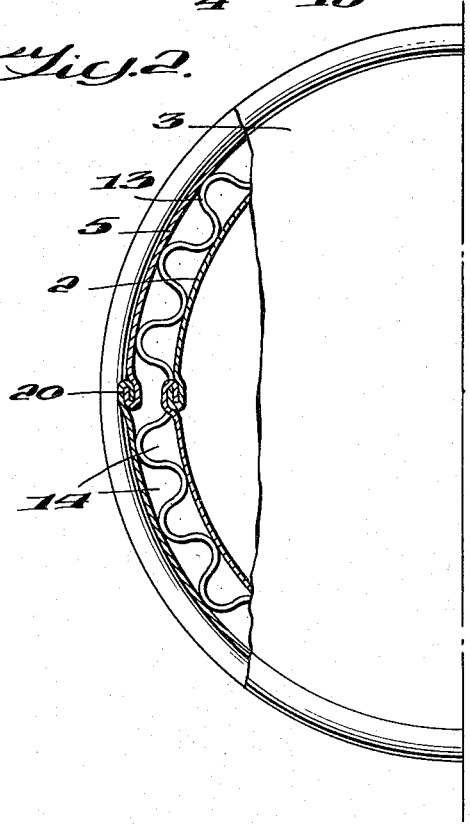
Fig. 2 is a partial view of the top of the container partly in section.

In assembling the self-heating container, the desired amount of calcined lime or other exothermic material, in powdered or granular form, is placed in a compact layer in the bottom of the outer container 1 to which a top 3 is later applied. The fibrous sheet 18 is inserted so that it completely covers the top of the layer 7 and extends around the sides with its edge positioned preferably slightly above the bottom 4 of the outer container 1. The closed food container 2, with a disc of ordinary or glazed paper 16 extending across the top and adhesively attached to the ridge of the crimped edge 8, and the corrugated spacing element 13 wrapped around the side wall of container 2 are inserted in the outer container 1 on top of the sheet 18. The width of the strip 13 is preferably no less than one-third the height of the food container 2. When ordinary metal cans are used having a seam in the side wall as shown at 20, the ends of the strip 13 are preferably opposite each other on either side of this seam as shown in Fig. 2. Before applying the top 3, a folded paper measuring cup 15 is placed on top of the disc 16. The top 3 of the outer container 1 is then sealed in place under vacuum. The relative dimensions of the various parts are such that, after packaging as described, the contents of the outer container including the particles of lime, the food container 2, and the spacing element 13 as well as the paper cup 15, are snugly held and clamped in place, and do not shift readily, even with vigorous shaking.

Figure 3:
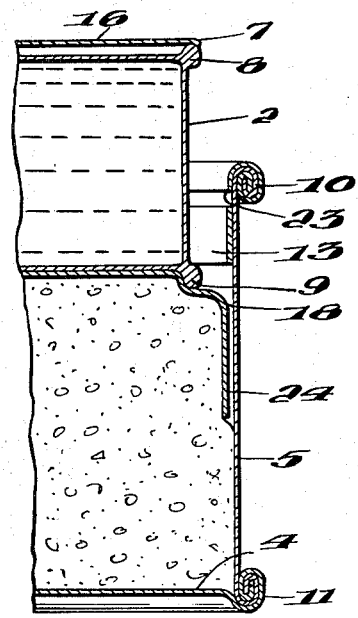
Fig. 3 is a view of a vertical section of a fragment showing substantially the relative position of parts in the container during a food-heating stage.

To serve heated food from the container 2 and hence to place the invention into operation, the top 3 of the outer container 1 is removed by means of an ordinary can opener which cuts out the top close to the crimp-sealed edge 10, and without penetrating the inner container 2. Water is measured in the cup 15 and poured onto the paper disc 16 from which the water flows off into the annular space 12 between the outer and inner containers and thence onto the sheet 18 which is capable of absorbing and distributing the water by capillary action toward the center of the container across the top of the layer of lime 7 as well as down the sides thereof. After the reaction between the lime and water commences, the reacting mass expands while generating heat, and the food container 2 moves outward through the open top of the outer container 1. In this telescopic outward movement, the food container 2 is guided by the spacing element 13 which is preferably movable with the container 2 either by attachment to it or by engagement of the crimped seal 9 with the lower edge of the spacing element. The crimped seal 9 serves in this case as an outwardly extending annular ledge. The unremoved outer portion of the top 3 left after removal of the central portion thereof forms a stop 23 (as shown in Fig. 3) which extends inwardly from the side wall of the outer container. As the food can moves upwardly, the upper edge of the spacing element 13 engages this stop 23 which prevents further movement of the container 2 and complete removal thereof. Also, as the food can moves upwardly, the downwardly projecting portion 24 of the sheet 18 is raised in the space between the layer 7 and the wall 5, and while permitting escape of steam it also prevents passage of particles of lime into the space 12.

After the elapse of time necessary for heating the food (the time depends on the kind of food) the disc 16 is torn away and the top of the food container 2 may be removed with the usual can opener.

It is understood that various changes may be made in the details of the above-described apparatus without departing from the scope of the invention as defined in the appended claims.

What is claimed is:

1. A self-heating container comprising a completely closed outer container having a bottom, a top and side wall; a closed food container beneath the top of the outer container; material for generating heat between the food container and the bottom of the outer container, and a spacing element movable between the food container and the side wall of the outer container by outward movement of said food container upon removal of the said top of the outer container and on expansion of the heat-generating material, the said spacing element directing the outward movement of said food container in spaced relationship with said side wall of said outer container and having passages for admitting a reagent to the bottom of the outer container to react with the heat-generating material to liberate heat.

2. A self-heating container as defined in claim 1, in which the spacing element encircles the food container and is slidable in the annular space between the food container and the side wall of the outer container for uniformly distributing the reagent onto said heat-generating material to react therewith for liberation of heat.

3. A self-heating container as defined in claim 1 in which the food container has an outwardly extending annular ledge which engages and moves the spacing element upon outward telescopic movement of the food container, and in which after removal of a central portion of the top of the outer container the unremoved outer portion of the said top forms a stop extending from the side wall of the outer container which engages the spacing element and with said latter element holds the food container and outer container together coaxially in alignment.

4. A self-heating container as defined in claim 1 in which the spacing element is a solid corrugated strip positioned between the food container and the side wall of the outer container, and having its corrugations directed toward the bottom of said outer container.

5. A self-heating container as defined in claim 1 in which the food container has a top crimp-sealed to its side wall, the crimped seal formed thereby extending upwardly from the edge of said top, and in which a removable sheet material is temporarily attached to the ridge of the said seal and extending across the said top of said food container to shed and distribute the reagent into the space between the food container and the side wall of the outer container.

6. A self-heating container comprising an outer container of sealed food-can construction for retaining its contents under subatmospheric pressure and having a top, a bottom and a side wall, a separate closed food container within said outer container and removable therefrom upon removal of said top, material for generating heat between the food container and the bottom of the outer container, and a spacing element between the food container and the side wall of the outer container and movable by outward movement of said food container for maintaining the said food container in its outward movement in spaced relationship with said side wall of said outer container, and said spacing element providing passages for admitting a reagent to the heat-generating material to react therewith for liberation of heat.

7. A self-heating container as defined in claim 6 in which the spacing element is a corrugated sheet material positioned between the food container and the side wall of the outer container, and having its corrugations directed toward the bottom of said outer container.

8. A self-heating container comprising a completely closed outer container, a closed food container within the outer container, material for generating heat in a layer positioned within the outer container for transferring heat to the food container, and a spacing element movable with the food container while maintaining the latter container in spaced relationship within the outer container when the food container is moved through an opening upon providing same in the outer container, and said spacing element providing passages for directing a reagent to the heat-generating material in the said layer to react therewith for liberation of heat.

References Cited in the file of this patent

UNITED STATES PATENTS

| 628,359 | Schindler | July 4, 1899 |
| 2,315,528 | Katz | Apr. 6, 1943 |
| 2,447,077 | Martin et al. | Aug. 17, 1948 |
| 2,579,405 | Sukacev | Dec. 18, 1951 |
| 2,620,788 | Rivoche et al. | Dec. 9, 1952 |

FOREIGN PATENTS

| 5,824 | Great Britain | of 1908 |